US011589596B2

(12) United States Patent
Mycock et al.

(10) Patent No.: US 11,589,596 B2
(45) Date of Patent: Feb. 28, 2023

(54) PRESERVED TEA PRODUCT

(71) Applicant: Conopco, Inc., Englewood Cliffs, NJ (US)

(72) Inventors: Gary Mycock, Rushden (GB); Elizabeth-Ann Simons, Bedford (GB)

(73) Assignee: CONOPCO, INC., Englewood Cliffs, NJ (US)

(*) Notice: Subject to any disclaimer, the term of this patent is extended or adjusted under 35 U.S.C. 154(b) by 0 days.

(21) Appl. No.: 17/425,662

(22) PCT Filed: Jan. 22, 2020

(86) PCT No.: PCT/EP2020/051530
§ 371 (c)(1),
(2) Date: Jul. 23, 2021

(87) PCT Pub. No.: WO2020/164873
PCT Pub. Date: Aug. 20, 2020

(65) Prior Publication Data
US 2022/0039419 A1 Feb. 10, 2022

(30) Foreign Application Priority Data
Feb. 14, 2019 (EP) ..................................... 19157077

(51) Int. Cl.
A23F 3/16 (2006.01)
A23L 27/20 (2016.01)
A23F 3/40 (2006.01)

(52) U.S. Cl.
CPC ................ *A23F 3/163* (2013.01); *A23F 3/40* (2013.01); *A23L 27/20* (2016.08)

(58) Field of Classification Search
CPC .... A23F 3/16; A23F 3/163; A23F 3/40; A23L 2/42; A23L 2/44; A23L 2/52
See application file for complete search history.

(56) References Cited

U.S. PATENT DOCUMENTS

| 5,888,571 | A | 3/1999 | Choi |
| 6,599,548 | B2* | 7/2003 | Blyth .................... A23F 3/163 426/330.3 |
| 7,799,364 | B2 | 9/2010 | Colliver et al. |
| 2001/0055646 | A1 | 12/2001 | Blyth et al. |
| 2002/0012737 | A1 | 1/2002 | Kirby et al. |
| 2007/0160737 | A1 | 7/2007 | Colliver et al. |
| 2007/0275140 | A1 | 11/2007 | Safko |
| 2011/0059205 | A1 | 3/2011 | Gaysinsky et al. |

FOREIGN PATENT DOCUMENTS

| CN | 105309706 | 2/2016 |
| CN | 103652075 | 3/2016 |
| CN | 106538748 | 3/2017 |
| WO | WO0187080 | 11/2001 |
| WO | WO0187095 | 11/2001 |
| WO | WO0187096 | 11/2001 |

OTHER PUBLICATIONS

International Preliminary Report on Patentability in PCT/EP2020/051530 dated Feb. 4, 2021 (11 pages).
R Rivola et al: "Non conventional antimicrobial substances in tea-based soft-drinks", Industrie delle Bevande, Jan. 1, 2000 (Jan. 1, 2000), pp. 129-136, XP055606956, Retrieved from the Internet: URL:https://www.cabdirect.org/cabdirect/abstract/20001416134 [retrieved on Jul. 18, 2019].
Search Report and Written Opinion in EP19157077; dated Jul. 29, 2019.
Search Report and Written Opinion in EP19157111; dated Jul. 29, 2019.
R Rivola et al; Non conventional antimicrobial substances in tea-based soft-drinks; Industrie delle Bevande; Jan. 1, 2000; 129-136 (with translation and original).
Zheng-Zhu Zhang et al; Antifungal Activities of Major Tea Leaf Volatile Constituents toward Colletorichum camelliae Massea; Journal of Agricultural and Food Chemistry; May 1, 2006; 3936-3940; vol. 54, No. 11.
Search Report and Written Opinion in EP19157108; dated Aug. 9, 2019.
Soichiro Nakamura et al; Green-Leaf-Derived C6-Aroma Compounds with Potent Antibacterial Action That Act on Both Gram-Negative and Gram-Positive Bacteria ; Journal of Agricultural and Food Chemistry; Dec. 1, 2002; 7639-7644; vol. 50, No. 26.
N.Belletti et al; Antimicrobial Activity of Aroma Compounds against *Saccharomyces ceresvisiae* and Improvement of Microbiological Stability of Soft Drinks as Assessed by Logistic Regression; Applied and Environmental Microbiology; Jul. 6, 2007; 5580-5586 (also as XP055252151); vol. 73, No. 17.
Wang Bing et al; Essential oils and ethanol extract from Camellia nitidissimaand evaluation of their biological activity; J. of Food Science and Technology; Oct. 6, 2018; 5075-5081; vol. 55 No. 12; Springer(India) Private Ltd.
Belletti et al.; Anitmicrobial Activity of Aroma Compounds against *Saccharomyces cerevisiae* and Improvement of Microbiologial Stability of Soft Drinks as Assessed by Logistic Regression; Applied and Environmental Microbiology; Jul. 6, 2007; 5580-5586; XP055252151; 73, No. 17; United States of America.
R Rivola et al; Non-conventional antimicrobial substances in tea-based drinks; .; Jan. 1, 2000; 129-136.

(Continued)

*Primary Examiner* — Erik Kashnikow
*Assistant Examiner* — Lela S. Williams
(74) *Attorney, Agent, or Firm* — Foley & Lardner LLP

(57) ABSTRACT

The invention relates to a tea product comprising a preservative composition, wherein the tea product is a ready-to-drink beverage or a beverage concentrate, and the preservative composition comprises: (A) hexanal; (B) E-2-hexenal; (C) E-2-hexenol; (D) E-linalool oxide; (E) methanol; and (F) methyl salicylate, wherein the total concentration of (A)+(B)+(C)+(D)+(E)+(F) in the tea product is 10 ppm to 10000 ppm, and wherein tea product comprises linalool at a concentration such that the ratio of the linalool concentration to the total concentration of (A)+(B)+(C)+(D)+(E)+(F) in the tea product is 1:14 to 1:800.

20 Claims, No Drawings

(56) References Cited

OTHER PUBLICATIONS

Search Report and Written Opinion in PCTEP2020051532 ; dated Apr. 7, 2020.
Search Report and Written Opinion in PCTEP2020051531; dated Apr. 7, 2020.
Search Report and Written Opinion in PCTEP2020051530; dated Apr. 7, 2020.
IPRP2 in PCTEP2020051531; dated Jan. 22, 2021.
IPRP2 in PCTEP2020051530; dated Feb. 4, 2021.
Written Opinion 2 in PCTEP2020051532; dated Feb. 1, 2021.
IPRP2 in PCTEP2019012478; dated Jul. 6, 2021.

\* cited by examiner

PRESERVED TEA PRODUCT

CROSS REFERENCE TO RELATED APPLICATIONS

The present application is a U.S. National Phase Application under 35 U.S.C. § 371 of International Application No. PCT/EP2020/051530, filed on Jan. 22, 2020, which claims priority to European patent application No. 19157077.9 filed on Feb. 14, 2019, the contents of which are incorporated herein in their entireties.

FIELD OF THE INVENTION

The present invention relates to a tea product comprising a preservative composition, and especially to such products which are either ready-to-drink beverages or beverage concentrates.

BACKGROUND OF THE INVENTION

Spoilage caused by a variety of microorganisms is one reason for food wastage. Spoilage is the process by which food deteriorates such that its edibility becomes reduced, ultimately resulting in the food becoming inedible to humans.

Moulds and/or yeasts growing on or within the food matrix may be responsible for food spoilage. Bacteria can also be responsible for food spoilage. Acids and metabolites are typically created in the processes by which bacteria break down food—even if the bacteria themselves are not harmful, the waste products may be unpleasant to taste or may even be harmful to health.

Consumers increasingly want convenience food to stay fresh and have a prolonged shelf life. Addition of preservatives to foodstuffs (such as beverages, spreads, dressings, convenience food, and so forth) is common practice in the food industry. The market for preservatives is growing in line with consumer demand.

Many countries have regulations that prohibit the use of certain food additives, including some preservatives, in foods and beverages. Although such regulations can vary widely, there is a clear trend for foods to contain fewer and lower levels of chemical preservatives, particularly synthetic ones.

Frequently used preservatives in beverage products include sorbates and benzoates. Unfortunately, the use of such preservatives can often impair the flavour of certain beverages. Furthermore, some consumers view these preservatives as the sort of chemical additives they would rather avoid. Indeed, there is a growing consumer trend for so-called "clean label" food products.

However, it is difficult to replace existing preservatives with "clean label" alternatives. In particular the replacement of sorbates is challenging, since many of the "natural" alternatives do not have a sufficient degree of anti-fungal activity.

Accordingly, there is a need for a "clean label" preservative which would provide the beneficial qualities of sorbates, particularly in terms of anti-fungal activity. Similarly, the formulation of beverages that have low levels of synthetic preservatives would also be desirable.

SUMMARY OF THE INVENTION

The inventors have found that certain volatile aroma compounds are effective at preventing the proliferation of food spoilage microorganisms, particularly fungi such as moulds and yeasts. In particular, they have identified that a particular combination of aroma compounds can reduce and/or prevent microbial spoilage of beverage products.

In a first aspect, the present invention relates to a tea product comprising a preservative composition, wherein the tea product is a ready-to-drink beverage or a beverage concentrate, and the preservative composition comprises:
(A) hexanal;
(B) E-2-hexenal;
(C) E-2-hexenol;
(D) E-linalool oxide;
(E) methanol; and
(F) methyl salicylate,
wherein the total concentration of (A)+(B)+(C)+(D)+(E)+(F) in the tea product is 10 ppm to 10000 ppm, and wherein tea product comprises linalool at a concentration such that the ratio of the linalool concentration to the total concentration of (A)+(B)+(C)+(D)+(E)+(F) in the tea product is 1:14 to 1:800.

In a second aspect, the invention also provides a method for preparing a preserved tea product, the method comprising adding a preservative composition to a tea product, wherein the tea product is a ready-to-drink beverage or a beverage concentrate, wherein the preservative composition comprises:
(A) hexanal;
(B) E-2-hexenal;
(C) E-2-hexenol;
(D) E-linalool oxide;
(E) methanol; and
(F) methyl salicylate,
wherein the total concentration of (A)+(B)+(C)+(D)+(E)+(F) in the tea product is 10 ppm to 10000 ppm, and wherein tea product comprises linalool at a concentration such that the ratio of the linalool concentration to the total concentration of (A)+(B)+(C)+(D)+(E)+(F) in the tea product is 1:14 to 1:800.

In a third aspect, the present invention relates to use of a composition comprising hexanal, E-2-hexenal, E-2-hexenol, E-linalool oxide, methanol and methyl salicylate as a preservative for a ready-to-drink beverage or a beverage concentrate.

DETAILED DESCRIPTION OF THE INVENTION

In a first aspect, the present invention relates to a tea product comprising a preservative composition, wherein the tea product is a ready-to-drink beverage or a beverage concentrate.

The tea product will contain tea solids. As used herein the term "tea solids" refers to dry material obtainable from the leaves of the plant *Camellia sinensis* var. *sinensis* and/or *Camellia sinensis* var. *assamica*. The tea solids can be provided by any suitable source, e.g. a tea extract (preferably in a powder format), a pressed tea juice, etc. The skilled person knows how to obtain such source materials.

Tea is known to have certain antimicrobial properties in itself, however this property (i.e. suppression of the growth of yeasts and moulds) is only evident once the concentration of tea solids exceeds 3%. At concentrations lower than this, which are typical for tea-based beverages (including tea concentrates), the tea acts as a nutrient that enhances the potential for microbial spoilage. The tea product preferably comprises 0.01% to 3% tea solids by weight of the product, more preferably 0.05% to 3%, most preferably 0.1% to 2%.

As used herein the term "beverage" refers to a substantially aqueous composition. The beverage may be in any format. For example, it may be in a ready-to-drink format or a concentrated format. A "ready-to-drink beverage" refers to a drinkable composition suitable for direct human consumption, and preferably comprises at least 85% water by weight, more preferably at least 90%, and most preferably at least 95%. A "beverage concentrate" refers to a beverage composition which typically requires dilution with an aqueous liquid (such as, e.g. water, carbonated water or milk) prior to consumption, as such this format will typically have a higher solids content (and thus a lower water content) than a ready-to-drink format. For example, prior to dilution a beverage concentrate preferably comprises at 25 to 85% water by weight, more preferably 40% to 80%, and most preferably 50% to 75%.

The tea product comprises a preservative composition, wherein the preservative composition comprises: (A) hexanal; (B) E-2-hexenal; (C) E-2-hexenol; (D) E-linalool oxide; (E) methanol; and (F) methyl salicylate. The total concentration of (A)+(B)+(C)+(D)+(E)+(F) in the tea product is 10 ppm to 10000 ppm. In other words, the total concentration of hexanal and E-2-hexenal and E-2-hexenol and E-linalool oxide and methanol and methyl salicylate in the tea product is 10 ppm to 10000 ppm.

Without wishing to be bound by theory, the inventors believe that tea product containing very low concentrations of the preservative composition may be prone to microbial spoilage at an earlier time point. Therefore, in order to provide a product with an extended shelf life the total concentration of (A)+(B)+(C)+(D)+(E)+(F) in the tea product is preferably at least 35 ppm, more preferably at least 60 ppm and most preferably at least 75 ppm.

A successful preservative composition inhibits spoilage microorganisms without interfering with the sensorial properties of the tea product. Without wishing to be bound by theory, the inventors believe that high concentrations of one or more of the volatile compounds in the preservative composition may impact the organoleptic properties of the tea product (e.g. by introducing unwanted flavour notes). Therefore, the total concentration of (A)+(B)+(C)+(D)+(E)+(F) in the tea product is preferably no more than 5000 ppm, more preferably no more than 3000 ppm, most preferably no more than 1500 ppm.

The present inventors have found that high concentrations of linalool tend to limit the effectiveness of the preservative composition, therefore the tea product comprises a limited amount of linalool. More precisely, the tea product comprises linalool at a concentration such that the ratio of the linalool concentration to the total concentration of (A)+(B)+(C)+(D)+(E)+(F) in the tea product is 1:14 to 1:800, preferably 1:15 to 1:650, 1:18 to 1:500, or even 1:20 to 1:450. It is noted that when specifying the ratio ranges of the linalool concentration to the total concentration of (A)+(B)+(C)+(D)+(E)+(F) in the tea product, any lower limit can be associated with any upper limit.

It is preferred that the tea product of the present invention has an acidic pH (i.e. a pH of less than 7). For example, the product may have a pH (at 20° C.) of 2 to 6. In particular the pH (at 20° C.) is preferably no more than 5, more preferably no more than 4.5 and most preferably from 2 to 4.

In order to achieve an acidic pH, the preserved beverage preferably comprises one or more acidulant. Suitable acidulants include organic acids such as citric acid, malic acid, lactic acid, tartaric acid, ascorbic acid, phosphoric acid, and salts thereof. Mixtures of one or more of these acidulants are also suitable. A particularly well-balance flavour may be provided when the acidulant comprises citric acid and/or a salt thereof. Mixtures of citric acid (and/or its salt), malic acid (and/or its salt), and ascorbic acid (and/or its salt) also provide good flavour. Typically, the concentration of the acidulant in the preserved beverage will be from 0.001 to 1% by weight, more preferably from 0.01 to 0.5% by weight.

In designing beverages which are protected against spoilage, some of the more commonly used preservatives are sorbates. As used herein the term "sorbates" includes sorbic acid (E200) and salts thereof—including sodium sorbate (E201), potassium sorbate (E202), and calcium sorbate (E203). Sorbates are particularly effective anti-fungal agents, and finding "natural" replacements has been a challenge. We have found that the preservative composition of the present invention can be used to fully or partially replace sorbates in a beverage product. For example, such a preservative composition may allow the use of reduced levels of sorbates in a ready-to-drink beverage or a beverage concentrate (while still achieving the same anti-spoilage effect as the conventional full dose of sorbates). A typical amount of potassium sorbate in beverage products is from 250 ppm to 1000 ppm. Thus, the tea product according to the present invention preferably comprises less than 200 ppm sorbates, more preferably less than 100 ppm sorbates, still more preferably less than 50 ppm sorbates, and most preferably less than 10 ppm sorbates.

Benzoates represent another class of commonly used preservatives, particularly in acidic foods such as soft drinks. We have found that the preservative composition of the present invention can be used to fully or partially replace benzoates in a beverage product. For example, the preservative composition may allow the use of reduced levels of benzoates in a ready-to-drink beverage or a beverage concentrate (while still achieving the same anti-spoilage effect as the conventional full dose of sorbates). As used herein the term "benzoates" includes benzoic acid (E210) and salts thereof—including sodium benzoate (E211), potassium benzoate (E212), and calcium benzoate (E213). A typical amount of sodium benzoates in beverages is from 150 ppm to 1000 ppm. Thus, the tea product according to the present invention preferably comprises less than 500 ppm benzoates, more preferably less than 100 ppm benzoates, still more preferably less than 50 ppm benzoates, and most preferably less than 10 ppm benzoates.

It is particularly preferred that the tea product is a flavoured beverage, more preferably a fruit-flavoured beverage, and most preferably a fruit-flavoured tea beverage. Suitable flavours include natural or synthetic fruit flavours, and/or natural or synthetic herb flavours. Examples of fruit flavours include: apple, apricot, blackcurrant, cherry, cranberry, grape, grapefruit, guava, kiwi, lemon, lime, lychee, mandarin, mango, nectarine, orange, peach, pear, pineapple, plum, passion fruit, raspberry, and strawberry. Examples of herb flavours include: chamomile, chrysanthemum, elderflower, hawthorn, hibiscus, jasmine, mate, mint (e.g. peppermint, spearmint), osmanthus, rose, and verbena (e.g. lemon verbena).

Consumers prefer beverages with a sweet taste. Therefore, the tea product preferably comprises nutritive sweetener, non-nutritive sweetener, or mixtures thereof.

Non-nutritive sweeteners allow beverages to be formulated that have a low energy content, and yet still taste pleasantly sweet. Health-conscious consumers often prefer such beverages. Preferred examples of non-nutritive sweeteners include aspartame, saccharin, acesulfame K, glycyrrhizin, stevia-derived sweetening agents (for example: stevioside, rebaudioside A, rebaudioside C, ducloside A;

preferred examples being stevioside and/or rebaudioside), sucralose, and mixtures thereof. Owing to their well-rounded flavour, the most preferred non-nutritive sweeteners are acesulfame K, aspartame, sucralose, rebaudioside A, or mixtures thereof. The concentration of non-nutritive sweetener will depend on the relative sweetness of the sweetener, and the composition of the beverage. Typically, the tea product will comprise non-nutritive sweetener in an amount of 0.00001 to 10% by weight of the beverage, more preferably 0.001 to 1% by weight and most preferably 0.01 to 0.1% by weight.

On the other hand, consumers may prefer the perceived naturalness of nutritive sweeteners. Examples of nutritive sweeteners include glucose, sucrose, fructose, and mixtures thereof. A particularly preferred example of a natural nutritive sweetener is honey.

The tea product may have a high calorie content (e.g. have an energy content of more than 100 kCal per 100 g of the beverage, preferably between 150 and 1000 kCal). Such products preferably comprise one or more nutritive sweetener(s), optionally in combination with one or more non-nutritive sweetener(s).

In one preferred embodiment, the tea product is a low-calorie beverage (e.g. having an energy content of less than 100 kCal per 100 g of the beverage). It is particularly preferred that a single serving of the beverage has a total energy content of less than 10 kCal, more preferably less than 5 kCal, most preferably less than 1 kCal. Low calorie beverages preferably comprise one or more non-nutritive sweetener(s).

Regardless of whether the tea product is a ready-to-drink beverage or a beverage concentrate, it is preferred that the tea product is packaged. Non-limiting examples of suitable packages include bottles, cans, cartons, pouches and sachets. For beverage concentrates, a particularly preferred packaging format is a bag in box (BiB) container. A BiB container typically comprises a bladder (e.g. a plastic bag or a bag made of layers of metalised film and/or plastics) seated inside a box (typically made of corrugated fibreboard). Products packed in this format can be shelf stable at room temperature for several months. When the tea product is a beverage concentrate, the product is preferably packaged in a bag in box container.

The tea product is preferably sanitised, e.g. by pasteurisation or sterilisation.

Although the black tea product may be manufactured in any convenient manner, the method according to the invention is preferably used. As set out above, one aspect of the invention relates to a method for preparing a preserved tea product, the method comprising adding a preservative composition to a tea product, wherein the tea product is a ready-to-drink beverage or a beverage concentrate, wherein the preservative composition comprises:

(A) hexanal;
(B) E-2-hexenal;
(C) E-2-hexenol;
(D) E-linalool oxide;
(E) methanol; and
(F) methyl salicylate, wherein the total concentration of (A)+(B)+(C)+(D)+(E)+(F) in the tea product is 10 ppm to 10000 ppm, and wherein tea product comprises linalool at a concentration such that the ratio of the linalool concentration to the total concentration of (A)+(B)+(C)+(D)+(E)+(F) in the tea product is 1:14 to 1:800.

The method is preferably used to prepare the tea product described above, and consequently the preferred technical features described for the tea product also apply mutatis mutandis to the method.

Preferably the method comprises an additional step of packaging the tea product and/or pasteurising or sterilising the tea product. It is particularly preferred that the method involves a sanitisation step wherein this step comprises heating the tea product at a temperature of between 60 and 100° C. for a time period of 1 to 20 minutes.

As used herein the term "comprising" encompasses the terms "consisting essentially of" and "consisting of". Where the term "comprising" is used, the listed steps or options need not be exhaustive. Except in the examples and comparative experiments, or where otherwise explicitly indicated, all numbers are to be understood as modified by the word "about". As used herein, the indefinite article "a" or "an" and its corresponding definite article "the" means at least one, or one or more, unless specified otherwise.

Unless otherwise specified, numerical ranges expressed in the format "from x to y" are understood to include x and y. In specifying any range of values or amounts, any particular upper value or amount can be associated with any particular lower value or amount. All percentages and ratios contained herein are calculated by weight unless otherwise indicated.

The various features of the present invention referred to in individual sections above apply, as appropriate, to other sections mutatis mutandis. Consequently features specified in one section may be combined with features specified in other sections as appropriate. Any section headings are added for convenience only, and are not intended to limit the disclosure in any way.

The following examples are intended to illustrate the invention and are not intended to limit the invention to those examples per se.

EXAMPLES

Combinations of aroma molecules were tested for growth inhibition of some common fungal spoilage microorganisms.

A cold-filled, non-preserved peach flavoured tea concentrate was used as the culture medium. This tea concentrate contained black tea extract powder (8.4 g/L), flavour (5.04 g/L), sucrose (444 g/L), citric acid (11.7 g/L), ascorbic acid (1.2 g/L) and water (balance).

The culture medium was spiked, either with an inoculum consisting of a cell suspension of two yeasts (*Candida parapsilosis* and *Zygosaccharomyces bailii*) or with an inoculum consisting of a cell suspension of two moulds (*Paecilomyces variotti* and *Neosartorya fischen*). In either case, the culture medium was spiked at a level of around 1000 cfu/ml. All samples and controls for each time point were prepared in triplicate.

The samples were incubated at 25° C., and the cultivation period was between 1 and 12 weeks. At each time point, serial dilutions of each sample and control were plated on OMEA plates. The diluent for the serial dilutions was MRD, and a minimum of 3 dilutions were plated out for each sample and control at each time point. The plates were incubated at 25° C. for 3 to 5 days, and growth of spoilage microorganisms was determined visually.

Example 1

Aroma composition stock solutions were prepared. Table 1 summarises the aroma compounds present in four such aroma composition stock solutions (Samples 1 to 4). The concentration of the compounds (where present) in each of the aroma composition stock solutions was as follows: methanol (12900 ppm), E-2-hexenal (6280 ppm), linalool (3170 ppm), Z-3-hexenol (1070 ppm), E-linalool oxide (973 ppm), methyl salicylate (833 ppm), hexanal (509 ppm), E-2-hexenol (492 ppm), acetaldehyde (365 ppm), Z-2-penten-1-o1 (344 ppm), 1-penten-3-ol (251 ppm), 1-penten-3-one (107 ppm).

TABLE 1 aroma compositions

| Compound | Sample 1 | Sample 2 | Sample 3 | Sample 4 | Sample 5 |
|---|---|---|---|---|---|
| Methanol | Y | Y | — | Y | Y |
| E-2-hexenal | Y | Y | — | Y | Y |
| Linalool | Y | — | Y | — | Y |
| Z-3-hexenol | Y | Y | — | — | — |
| E-linalool oxide | Y | Y | — | Y | Y |
| Methyl salicylate | Y | Y | — | Y | Y |
| Hexanal | Y | Y | — | Y | Y |
| E-2-hexenol | Y | Y | — | Y | Y |
| Acetaldehyde | Y | Y | — | — | — |
| Z-2-penten-1-ol | Y | Y | — | — | — |
| 1-penten-3-ol | Y | Y | — | — | — |
| 1-penten-3-one | Y | Y | — | — | — |

For the fungal growth inhibition studies, the appropriate stock solution was diluted in the culture media (i.e. non-preserved peach flavoured tea concentrate) such that the culture media contained 2% (by volume) of the applicable aroma composition. In each study, the appropriate controls were included. These controls were as follows:

Control 1: positive control (i.e. culture medium without any aroma composition spiked with the inoculum);

Control 2: negative control (i.e. unspiked culture medium containing 2% aroma composition); and Control 3: sterility control (i.e. unspiked culture medium without any aroma composition).

The results of the fungal growth inhibition studies are summarised in Table 2 (below). The data is from the 1 in 10 serial dilution, and is the mean of the triplicate samples.

With regard to the controls, the positive control (Control 1) resulted in >300 cfu/ml at all time points regardless of the inoculum used. Both the negative control (Control 2) and the sterility control (Control 3) resulted in <1 cfu/ml at all time points (data not included in Table 2).

The samples containing all 6 of hexanal, E-2-hexenal, E-2-hexenol, E-linalool oxide, methanol and methyl salicylate (i.e. Samples 1, 2, 4 and 5) all show at least some anti-fungal activity against both yeasts and moulds. Whereas Sample 3 (linalool only) did not show anti-fungal activity against yeasts or moulds.

It is apparent that the samples which contain the 6 listed compounds and linalool (i.e. Samples 1 and 5) are less effective long-term anti-fungal agents, and are most effective for periods of less than a month. In contrast, the samples which contain all 6 of hexanal, E-2-hexenal, E-2-hexenol, E-linalool oxide, methanol and methyl salicylate without linalool (i.e. Samples 2 and 4) show long-term anti-fungal activity, with Sample 4 showing anti-fungal activity against both yeasts and moulds for at least 12 weeks.

TABLE 2 results of fungal growth inhibition study

| Sample ID | Cultivation period (weeks) | Fungal growth (cfu/ml) Mould inoculum | Fungal growth (cfu/ml) Yeast inoculum |
|---|---|---|---|
| Sample 1 | 1 | <1 | <1 |
| | 2 | <1 | <1 |
| | 3 | <1 | <1 |
| | 4 | >300 | <1 |
| | 7 | >300 | <1 |
| | 12 | >300 | — |
| Sample 2 | 1 | <1 | <1 |
| | 2 | <1 | 4 |
| | 3 | <1 | 4 |
| | 4 | <1 | 3.3 |
| | 7 | <1 | <1 |
| | 12 | >300 | 4.7 |
| Sample 3 | 1 | >300 | >300 |
| | 2 | >300 | >300 |
| | 3 | >300 | >300 |
| | 4 | >300 | >300 |
| | 7 | >300 | >300 |
| | 12 | >300 | >300 |
| Sample 4 | 1 | <1 | <1 |
| | 2 | <1 | <1 |
| | 3 | <1 | <1 |
| | 4 | <1 | <1 |
| | 7 | <1 | <1 |
| | 12 | <1 | <1 |
| Sample 5 | 1 | <1 | <1 |
| | 2 | <1 | <1 |
| | 3 | <1 | <1 |
| | 4 | <1 | 82.3 |
| | 7 | <1 | 8.3 |
| | 12 | 3 | >300 |
| Control 1 | 1 | >300 | >300 |
| | 2 | >300 | >300 |
| | 3 | >300 | >300 |
| | 4 | >300 | >300 |
| | 7 | >300 | >300 |
| | 12 | >300 | >300 |

The invention claimed is:

1. A tea product comprising a preservative composition, wherein the tea product is a ready-to-drink beverage or a beverage concentrate, and the preservative composition comprises:
   (A) hexanal;
   (B) E-2-hexenal;
   (C) E-2-hexenol;
   (D) E-linalool oxide;
   (E) methanol; and
   (F) methyl salicylate,
   wherein the total concentration of (A)+(B)+(C)+(D)+(E)+(F) in the tea product is 10 ppm to 10000 ppm, and
   wherein tea product comprises linalool at a concentration such that the ratio of the linalool concentration to the total concentration of (A)+(B)+(C)+(D)+(E)+(F) in the tea product is 1:14 to 1:800.

2. The tea product as claimed in claim 1, wherein the total concentration of (A)+(B)+(C)+(D)+(E)+(F) in the tea product is 35 ppm to 5000 ppm.

3. The tea product as claimed in claim 1, wherein the ratio of linalool to the total concentration of (A)+(B)+(C)+(D)+(E)+(F) in the tea product is 1:18 to 1:500.

4. The tea product as claimed in claim 1, wherein the tea product comprises 0.05% to 3% by weight of tea solids.

5. The tea product as claimed in claim 1, wherein the product has a pH of 2 to 6.

6. The tea product as claimed in claim 1, wherein the product comprises less than 200 ppm sorbates.

7. The tea product as claimed in claim 1, wherein the product comprises less than 100 ppm benzoates.

8. The tea product as claimed in claim 1, wherein the product additionally comprises natural or synthetic fruit flavour and/or natural or synthetic herb flavours.

9. The tea product as claimed in claim 1, wherein the product comprises one or more sweetener, the sweetener being a nutritive sweetener, a non-nutritive sweetener, or a combination thereof.

10. The tea product as claimed in claim 1, wherein the product is a beverage concentrate comprising 25 wt. % to 75 wt. % water.

11. The tea product as claimed in claim 10, when the product is packaged in a bag in box container.

12. A method for preparing a preserved tea product, the method comprising adding a preservative composition to a tea product, wherein the tea product is a ready-to-drink beverage or a beverage concentrate, wherein the preservative composition comprises:
(A) hexanal;
(B) E-2-hexenal;
(C) E-2-hexenol;
(D) E-linalool oxide;
(E) methanol; and
(F) methyl salicylate,
wherein the total concentration of (A)+(B)+(C)+(D)+(E)+(F) in the tea product is 10 ppm to 10000 ppm, and
wherein tea product comprises linalool at a concentration such that the ratio of the linalool concentration to the total concentration of (A)+(B)+(C)+(D)+(E)+(F) in the tea product is 1:14 to 1:800.

13. The method as claimed in claim 12, wherein, the method comprises an additional step of packaging the preserved tea product.

14. The method as claimed in claim 12, wherein the method comprises an additional step of pasteurising or sterilising the preserved tea product.

15. The tea product as claimed in claim 5, wherein the product has a pH of 2 to 4.

16. The tea product as claimed in claim 6, wherein the product comprises less than 100 ppm sorbates.

17. The tea product as claimed in claim 7, wherein the product comprises less than 50 ppm benzoates.

18. The tea product as claimed in claim 1, wherein the tea product is a black tea product.

19. The tea product as claimed in claim 1, wherein the ratio of linalool to the total concentration of (A)+(B)+(C)+(D)+(E)+(F) in the tea product is 1:20 to 1:800.

20. A tea product comprising a preservative composition, wherein the tea product is a ready-to-drink beverage or a beverage concentrate, said preservative composition consisting essentially of:
(A) hexanal;
(B) E-2-hexenal;
(C) E-2-hexenol;
(D) E-linalool oxide;
(E) methanol; and
(F) methyl salicylate,
wherein the total concentration of (A)+(B)+(C)+(D)+(E)+(F) in the tea product is 10 ppm to 10000 ppm, and
wherein tea product comprises linalool at a concentration such that the ratio of the linalool concentration to the total concentration of (A)+(B)+(C)+(D)+(E)+(F) in the tea product is 1:14 to 1:800.

* * * * *